Patented Nov. 25, 1952

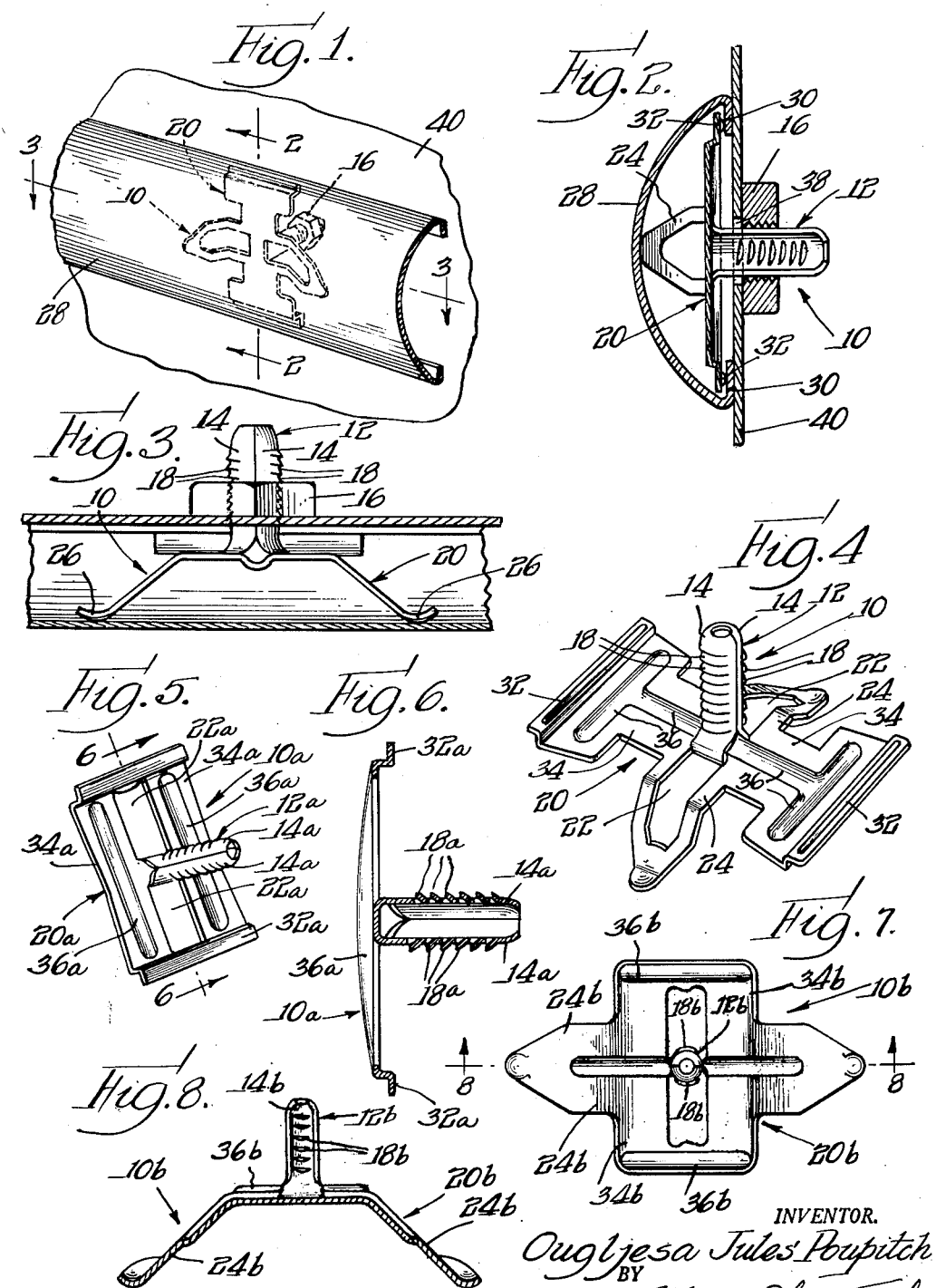

2,618,824

UNITED STATES PATENT OFFICE 2,618,824

MOLDING FASTENER

Ougljesa Jules Poupitch, Chicago, Ill., assignor to Illinois Tool Works, Chicago, Ill., a corporation of Illinois Application October 11, 1947, Serial No. 779,284

2 Claims. (Cl. 24—73)

This invention relates generally to fasteners, and more particularly to sheet metal fasteners of the type equipped with a shank portion for accommodating a nut and a resilient head portion at one extremity.

Various types of fastening devices have been employed heretofore for the purpose of securing molding strips or trim in position. For example, in the automotive industry chromium plated or polished stainless steel strips are often employed for decorative purposes, and these strips must be held against the work surface in such a manner as to conceal the device employed to secure them in position. These devices are commonly referred to as molding clips in that they are designed to bear against the inturned flanges of the chromium plated trim and are provided with means to clip the opposite surface of the work piece for holding the molding in place.

The present invention relates more specifically to a fastener or molding clip of the type employing threaded means, such as a nut, for engaging the surface of the work piece oppositely disposed from the molding trim. It is an important object of the present invention to provide a molding clip or fastener of the type referred to wherein a single piece of sheet metal may be configurated so as to present a tubular nut accommodating shank and a resilient head portion for engaging the inturned flanges of a strip of molding material.

Still more specifically, the present invention contemplates a sheet metal one-piece fastener having a tubular shank portion provided with peripheral extrusions for accommodating the internal threads of a nut, and a resilient head portion specially designed to accommodate any given size or shape of molding trim.

It is a further object of the present invention to provide a one-piece molding clip or fastener in which the head portion is of such size, shape and resilience as to greatly facilitate the ease with which it may be employed to secure a molding in position.

The foregoing and other objects and advantages will be more apparent from the following detailed description when considered in connection with the accompanying drawings, wherein:

Fig. 1 is a perspective view of a strip of molding material secured to a work sheet by means of a fastener of the type contemplated by the present invention;

Fig. 2 is an enlarged vertical sectional view taken substantially along the line 2—2 of Fig. 1;

Fig. 3 is an enlarged horizontal view taken substantially along the line 3—3 of Fig. 1;

Fig. 4 is a perspective view of the fastener shown in Figs. 1 to 3, inclusive;

Fig. 5 is a perspective view of a modified form of molding clip;

Fig. 6 is a central transverse sectional view of the fastener or molding clip illustrated in Fig. 5, said section being taken substantially along the line 6—6 of Fig. 5;

Fig. 7 is a plan view of a further modified form of fastener; and

Fig. 8 is a central vertical sectional view taken substantially along the line 8—8 of Fig. 7.

Referring now to the drawing wherein like numerals have been employed to designate similar parts throughout the various views, it will be seen that one embodiment of the invention resides in a sheet metal molding clip or fastener designated generally by the numeral 10, Figs. 1 to 4, inclusive. This fastener 10 is of one-piece sheet metal construction. It consists of a tubular shank portion 12 comprised of two symmetrical half sections 14, the longitudinal margins of which are in abutting relation. The outer or entering extremity of the shank 12 is preferably tapered to a reduced diameter to facilitate application thereto of a complementary fastening member or nut 16. Oppositely disposed peripheral areas of the shank halves 14 are severed or extruded to provide a series of thread portions 18. These thread portions 18 in the disclosed embodiment are of limited circumferential extent and are helically disposed in conformity with the threaded helix of the nut 16. This arrangement of the shank makes for rigidity, as well as very high shear and tensile strength.

It is important to note that the shank halves or semi-cylindrical sections 14 are struck from a fastener head portion designated generally by the numeral 20. The areas from which the shank halves 14 are struck is indicated by the numeral 22. The head 20 in the embodiment disclosed in Figs. 1 to 4, inclusive, consists in oppositely disposed resilient sections 24 which define the above mentioned areas or apertures 22. These head sections 24 consist of a portion adjacent the shank 12 extending normally to the shank axis, and the outer portions of the heads 24 are inclined away from the shank base. The free extremities of the head or arm portions 24 are provided with curved molded tips 26 to facilitate engagement with the underside of a molding strip 28, as clearly illustrated in Figs. 2 and 3. By having the arms 24 flexed so as to position the tips 26 thereof at a distance from the head 20, a distance greater than the maximum height of the arcuate strip 28 makes it necessary to flex the arms 24 rearwardly in order to insert the head within the hollow area defined by the molding strip. It will be seen from the cross-sectional view of the molding strip 28, Figs. 1 and 2, that inturned flanges 30 are engaged by outer tips 32 of head portions or sections 34. These head sections 34 extend laterally from the base of the stud 12 at right angles to the head sections 24 and are relatively rigid as compared to the resilient sections 24. To afford increased rigidity, the head sections 34 are provided with embossed ribs 36 extending transversely thereof.

In use, the fastener 10 is first assembled with the molding trim 28 by sliding it longitudinally within said strip. The tips or feet 32 slide along the inner surfaces of the molding strip flanges 30 and the arms or head sections 24 are flexed, thereby resiliently urging the tips 32 against the flanges 30. Thus the fastener is secured against unauthorized or inadvertent shifting longitudinally with respect to the molding strip 28. With the fastener properly positioned within the molding strip, the shank 12 is brought into registration with an aperture 38 of a work piece 40 and telescopically associated therewith. The nut 16 is then applied to the shank and tightened against the inner surface of the work sheet 40. It is conventional practice to employ a plurality of fasteners for each length of molding strip.

Figs. 5 and 6 disclose a slightly modified form of fastener or molding clip designated generally by the numeral 10a. The fastener 10a is provided with a shank 12a corresponding structurally with the shank 12 previously described. Thus the shank 12a is formed of two semi-circular half sections 14a and a plurality of protuberances or extrusions 18a for accommodating a nut. The only structural distinction between the fastener 10a and the fastener 10 previously described resides in the head portion which is designated generally by the numeral 20a. The shank halves 14a are struck up from the head portion 20a, the area from which said shank portions are struck being designated by the numeral 22a. The head portion 20a is not equipped with resilient head sections corresponding to the resilient head sections 24 previously described. The head portion 20a does incorporate rigid sections 34a which are provided with strengthening bosses or ribs 36a. The opposite extremity of the head sections 34a are equipped with the flange engaging feet 32a which function similarly to the feet or tips 32 previously described.

Figs. 7 and 8 disclose a still further modified form of fastener designated generally by the numeral 10b. The shank portion 12b corresponds structurally with the shank portion 12a previously described. However, it should be noted that in this embodiment the shank portion is not struck from within the peripheral margin of the arm portions 24b, but rather is stamped from the head portion 20b. This provides a structure wherein both the head portion 20b and the arm portions 24b are of a rigid construction. In all other respects the head portion 20b is similar to the head portion 20 shown in a previous embodiment in that ribs are provided for stiffening purposes and the molding engaged in a similar fashion.

From the foregoing it will be apparent that the present invention contemplates a sheet metal one-piece molding fastener or clip of improved practical design. By the practice of conventional stamping and forming methods, the fasteners may be produced very economically. The tubular sheet metal shank provided with thread engaging projections is designed to resist high shear and tensile stresses, and by relieving a portion of the head structure to provide the semi-cylindrical shank sections, desired increased resiliency in certain sections of the head is attained.

While specific structural details have been disclosed herein for the purpose of illustrating certain practical embodiments of the invention, it will be understood that other modifications and changes may be made without departing from the spirit and scope of the appended claims.

The invention is hereby claimed as follows:

1. A one piece sheet metal molding clip formed from a cruciform shaped blank with opposed pairs of arms, one set of opposed arms providing a head with opposed margins thereof engageable with inturned flanges of a complemental channeled molding member, the other set of opposed arms being deformed out of the plane of said head in one direction with the extremities thereof positioned to engage the inner surface of the complemental channeled molding member whereby the resiliency of said latter arms provide tensioning means to retain the clip in any selected position within the molding member, a stud portion comprising a plurality of sections struck from within the margins of one set of arms to leave connected bearing portions at the extremities thereof, said struck sections being oppositely concaved and arranged in abutment to provide a tubular stud projecting in the opposite direction from said head, and peripheral protuberant means on said stud sections helically disposed to accommodate the convolutions of an internally threaded rotary fastener.

2. A one piece sheet metal molding clip as claimed in claim 1, wherein the sections forming the stud portion are struck from the set of arms which are deformed out of the plane of the head.

OUGLJESA JULES POUPITCH.

REFERENCES CITED

The following references are of record in the file of this patent:

UNITED STATES PATENTS

| Number | Name | Date |
| --- | --- | --- |
| 1,176,333 | Baker | Mar. 21, 1916 |
| 1,224,431 | Van Vorst | May 1, 1917 |
| 1,578,963 | Dunlap | Mar. 30, 1926 |
| 2,051,407 | Jones | Aug. 18, 1936 |
| 2,138,195 | Place | Nov. 29, 1938 |
| 2,187,321 | Johnson | Jan. 16, 1940 |
| 2,267,873 | Place | Dec. 30, 1941 |
| 2,286,696 | Tinnerman | June 16, 1942 |
| 2,324,654 | Tinnerman | July 20, 1943 |
| 2,391,298 | Davis | Dec. 18, 1945 |
| 2,473,400 | Waara | June 14, 1949 |
| 2,521,354 | Flora | Sept. 5, 1950 |
| 2,531,351 | Churchill | Nov. 21, 1950 |